(12) United States Patent
Hamburg

(10) Patent No.: US 6,825,852 B1
(45) Date of Patent: Nov. 30, 2004

(54) COMBINING IMAGES INCLUDING TRANSPARENCY BY SELECTING COLOR COMPONENTS

(75) Inventor: Mark Hamburg, Scotts Valley, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/572,388

(22) Filed: May 16, 2000

(51) Int. Cl.[7] .............................................. G06T 11/40
(52) U.S. Cl. ...................... 345/592; 345/589; 345/593; 345/603; 345/604
(58) Field of Search ................................ 345/592, 589, 345/593, 419, 594, 595, 629, 603–604

(56) References Cited

U.S. PATENT DOCUMENTS

| | | | | |
|---|---|---|---|---|
| 5,347,622 A | * | 9/1994 | Takemoto et al. | 395/135 |
| 5,745,121 A | * | 4/1998 | Politis | 345/433 |
| 5,864,342 A | | 1/1999 | Kajiya et al. | |
| 5,896,136 A | * | 4/1999 | Augustine et al. | 345/605 |
| 5,907,315 A | | 5/1999 | Vlahos et al. | |
| 5,963,201 A | * | 10/1999 | McGreggor et al. | 345/722 |
| 6,020,897 A | * | 2/2000 | Carlsen et al. | 345/629 |
| 6,038,031 A | * | 3/2000 | Murphy | 358/1.09 |
| 6,049,390 A | * | 4/2000 | Notredame et al. | 358/1.15 |
| 6,100,899 A | * | 8/2000 | Ameline et al. | 345/605 |
| 6,208,351 B1 | * | 3/2001 | Borg et al. | 345/431 |
| 6,211,881 B1 | * | 4/2001 | Gabler et al. | 345/418 |
| 6,289,364 B1 | * | 9/2001 | Borg et al. | 707/526 |
| 6,313,847 B1 | * | 11/2001 | Carlsen | 345/629 |
| 6,570,579 B1 | * | 5/2003 | MacInnis et al. | 345/629 |

OTHER PUBLICATIONS

Adobe Systems Incorporated, "PDF Reference, Third Edition, Adobe Portable Document Format; Section 7.6.3: Overprinting and Transparency," Dec., 20001, Boston.

* cited by examiner

Primary Examiner—Matthew Luu
Assistant Examiner—Daniel J Chung
(74) Attorney, Agent, or Firm—Fish & Richardson P.C.

(57) ABSTRACT

Methods and apparatus including computer program products for combining source images to form a final image, each image being a digital image defined by color component values and a transparency value. The invention performs the steps of receiving two or more source images, each defined by color component and alpha information; assembling a new, mixed image in per-component format by applying a selection operation on the color and alpha information of the source images to define color component and alpha information of the new image according to a source selection definition; and converting the new per-component image into a shared-alpha format to generate the final image in shared-alpha format. In particular embodiments, the selection selects a color value and alpha pair from exactly one source image for each color component of the combined image. The mixed image in per-component format can be converted to a shared-alpha format through use of a matting color.

46 Claims, 3 Drawing Sheets

COMBINING IMAGES INCLUDING TRANSPARENCY BY SELECTING COLOR COMPONENTS

BACKGROUND

The invention relates to techniques for combining two or more images defined by color and alpha information to produce a new image also defined by color and alpha information.

The compositing of digital images is done with images defined by color information and alpha (also called transparency) information. The color information describes what color the image is at a particular location. The alpha information describes how much color there is at a particular location—i.e., in simple, normal mode compositing, how much the color obscures the data that lies beneath it. If the images are considered as painted on sheets of acetate, then the color information describes the color of the paint while the alpha information describes its density.

Colors are generally represented by one or more color components, sometimes referred to as colorants. For example, a color video cathode ray tube can reproduce a significant fraction of the range of visible colors using a mixture of red, green, and blue light. Because of impurities in the inks and other physical limitations, printed color generally uses four inks: cyan, magenta, yellow, and black (CMYK).

To represent the color and alpha information in an image at a particular location in the image, a number for every color component and a number for the alpha value is required. The color values can cover arbitrary ranges; however, these are generally normalized to the range of zero to one, and the range of zero to one will be used in the examples of this specification. Similarly, this specification will treat alpha values in the conventional way as having a range from zero (fully transparent) to one (fully opaque).

In many compositing operations, the compositing operation uses the result of multiplying the color component values by the alpha value. This results in a format known as pre-multiplied alpha. One benefit of this format is that it resolves the question of what color the fully transparent regions have by multiplying it with zero and thereby arriving at zero as the value for the pre-multiplied color components. Thus, $<C0, C1, \ldots, Cn, A>$ is transformed into $<C0*A, C1*A, \ldots, Cn*A, A>$. (The notation $< \ldots >$ indicates a vector of elements that defines a color, where $Ci$ is the value of the i-th color component, $A$ is the value of alpha, and $*$ is the scalar multiplication operator. The values $Ci$ and $A$ are generally normalized to range from zero to one, inclusive.)

The case of pre-multiplied alpha can be generalized to matted images by specifying that the color values are stored as if the image had been blended (matted) against some particular background using linear interpolation on the components. Pre-multiplied alpha corresponds to matting against the color with all components zero. The vector from above now becomes $<C0*A+M0*(1-A), \ldots, Cn*A+Mn*(1-A), A>$. (The $Mi$ is value of the i-th color component of the matting color.)

What has been described so far is a shared-alpha format, in which all of the color components have the same alpha value. The shared-alpha format can be generalized to a per-component alpha by associating an alpha value $Ai$ with each component, thus yielding:

$$<<C0, A0>, <C1, A1>, \ldots, <Cn, An>>.$$

As long as compositing operations are separable—i.e., can be applied to each color component independently—each component is composited as if it were a grayscale image with a single alpha value. The matted version of per-component alpha looks like this:

$$<<C0*A0+M0*(1-A0), A0>, \ldots, <Cn*An+Mn*(1-An), An>>.$$

SUMMARY

The present invention provides methods and apparatus including computer program products for combining source images to form a final image, each image being a digital image defined by color component values and a transparency value. The invention performs the steps of receiving two or more source images, each defined by color component and alpha information; assembling a new, mixed image in per-component format by applying a selection operation on the color and alpha information of the source images to define color component and alpha information of the new image according to a source selection definition; and converting the new per-component image into a shared-alpha format to generate the final image in shared-alpha format.

In general, in one aspect, the invention provides a technique for combining source images to form a final image, each image being a digital image defined by color component values and a transparency value. The technique includes converting each of two or more shared-alpha source images into corresponding per-component source images in which each color component value is paired with a per-component alpha value, the alpha value indicating to what extent color exists in a range of fully transparent to fully opaque; assembling a new image in per-component format by selecting each color and alpha pair for each component of the new image from exactly one of the source images in per-component format according to a source selection definition; and converting the new per-component image into shared-alpha format to generate the final image in shared-alpha format.

Embodiments may include one or more of the following features.

The new per-component image is a matted image having color and alpha pairs at each location of the image $<<X0, A0>, \ldots, <Xn, An>>$, the $Xi$ being the color value of the new image of the i-th color component, the $Ai$ being the alpha value paired with the i-th color component, and the image being matted with a matting color $M$ having color component values $Mi$. The final image is in a matted shared-alpha format $<C0, \ldots, Cn, A>$, the $Ci$ being the color value of the i-th color component and the $A$ being the shared alpha value. The $Ci$ and $A$ satisfy the two relationships $A \geq \text{Max}(Ai)$, where $i$ ranges over the color components, and $Ci = Xi$. The $A$ satisfies the relationship $A = \text{Max}(Ai)$. The source images are converted into a matted format with the matting color $M$ before the assembling of the new per-component image occurs.

The new per-component image can be a matted image having color and alpha pairs at each location of the image $<<X0, A0>, \ldots, <Xn, An>>$, the $Xi$ being the matted color value of the i-th color component, the $Ai$ being the alpha value paired with the i-th color component, and the image being matted with a matting color $M$ having color component values $Mi$. The final image can be in an unmatted shared-alpha format.

The source images can be converted into a matted format with the matting color $M$ before the assembling of the new per-component image occurs. The source images can be converted from an unmatted format. The source images can be converted from a matted format with a matting color different from M. The source selection definition may be location independent. The number of source images can be two. The color components can be cyan, magenta, yellow, and black and the matting color M can be white.

In another aspect, the present invention provides methods and apparatus including computer program products for combining source images to form a final image, each image being a digital image defined by color component values and a transparency value. The invention performs the steps of converting each of two or more unmatted, shared-alpha source images into a corresponding unmatted per-component source image in which each color component value is paired with a per-component alpha value, the alpha value indicating to what extent color exists in a range of fully transparent to fully opaque; assembling a new image in per-component format <<P0, A0>, . . . , <Pn, An>> by selecting each color and alpha pair for each component of the new image from exactly one of the per-component source images according to a source selection definition; and converting the new per-component image into a final unmatted shared-alpha image <C0, . . . , Cn, A>, the Ci being the color value of the i-th color component of the final image and the A being the shared alpha value of the final image, the Ci and A satisfying the two relationships $$A = \text{Max}(Ai),$$

where i ranges over the color components, and $$Ci = Pi*(Ai/A) + Mi*(1-(Ai/A)),$$

where Mi is the color value of the i-th color component of a matting color.

In another aspect, the present invention provides methods and apparatus including computer program products for converting an image in a per-component format into an image in a shared-alpha format. The invention performs the steps of receiving a matted per-component image having color and alpha pairs at each location representable as <<X0, A0>, . . . , <Xn, An>>, the Xi being the matted color value of the i-th color component and the Ai being the alpha value paired with the i-th color component of the per-component image; and calculating the color values and alpha of a shared-alpha image representable as <C0, . . . , Cn, A>, the Ci being the color value of the i-th color component and the A being the shared alpha value, the Ci and A being calculated to satisfy the relationships $$A \geq \text{Max}(Ai),$$

where i ranges over the color components, and $$Ci = (Xi - Mi*(1-A))/A,$$

where Mi is the color value of the i-th color component of a matting color.

In another aspect, the present invention provides methods and apparatus including computer program products for converting an image in a per-component format into an image in a shared-alpha format. The invention performs the steps of receiving an unmatted per-component image having color and alpha pairs at each location representable as <<P0, A0>, . . . , <Pn, An>>, the Pi being the color value of the i-th color component and the Ai being the alpha value paired with the i-th color component of the per-component image; and calculating the color values and alpha of an unmatted shared-alpha image representable as <C0, . . . , Cn, A>, the Ci being the color value of the i-th color component and the A being the shared alpha value, the Ci and A being calculated to satisfy the relationships $$A \geq \text{Max}(Ai),$$

where i ranges over the color components, and $$Ci = Pi*(Ai/A) + Mi*(1-(Ai/A)),$$

where Mi is the color value of the i-th color component of a matting color.

In another aspect, the present invention provides methods and apparatus including computer program products for overprinting an element into a base image having transparency. The invention performs the steps of marking an element into a base image; and using component-restricted blending to blend the base image from before the marking operation with the base image after the marking operation to generate a final image in which one or more excluded color components match closely in the base image, whereby only a subset of the color components of the resulting base image appear to have been marked.

In another aspect, the present invention provides methods and apparatus including computer program products for combining source images to form a final image, each image being a digital image defined by color component values and a transparency value. The invention performs the steps of receiving two or more source images, each defined by color component and alpha information; assembling a new, mixed image in per-component format by applying a selection operation on the color and alpha information of the source images to define color component and alpha information of the new image according to a source selection definition; and converting the new per-component image into a shared-alpha format to generate the final image in shared-alpha format.

Embodiments may include the following features.

The source selection definition corresponds to a selection matrix with elements S(i, j), where i ranges over the color components, j ranges over the source images, and S(i, j) is the weight given to the contribution to the i-th color component and alpha of the mixed image from the i-th color component and alpha of the j-th source image.

The present invention also provides a general mechanism that can be used to blend a series of digital graphics elements together and then restrict the changes to a subset of the elements' color components.

Advantages that can be seen in implementations of the invention include one or more of the following. Separating component restrictions from other aspects of blending provides flexibility in defining and implementing graphics operations. The invention allows overprinting and component restrictions to be implemented independently from other elements of a compositing process.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
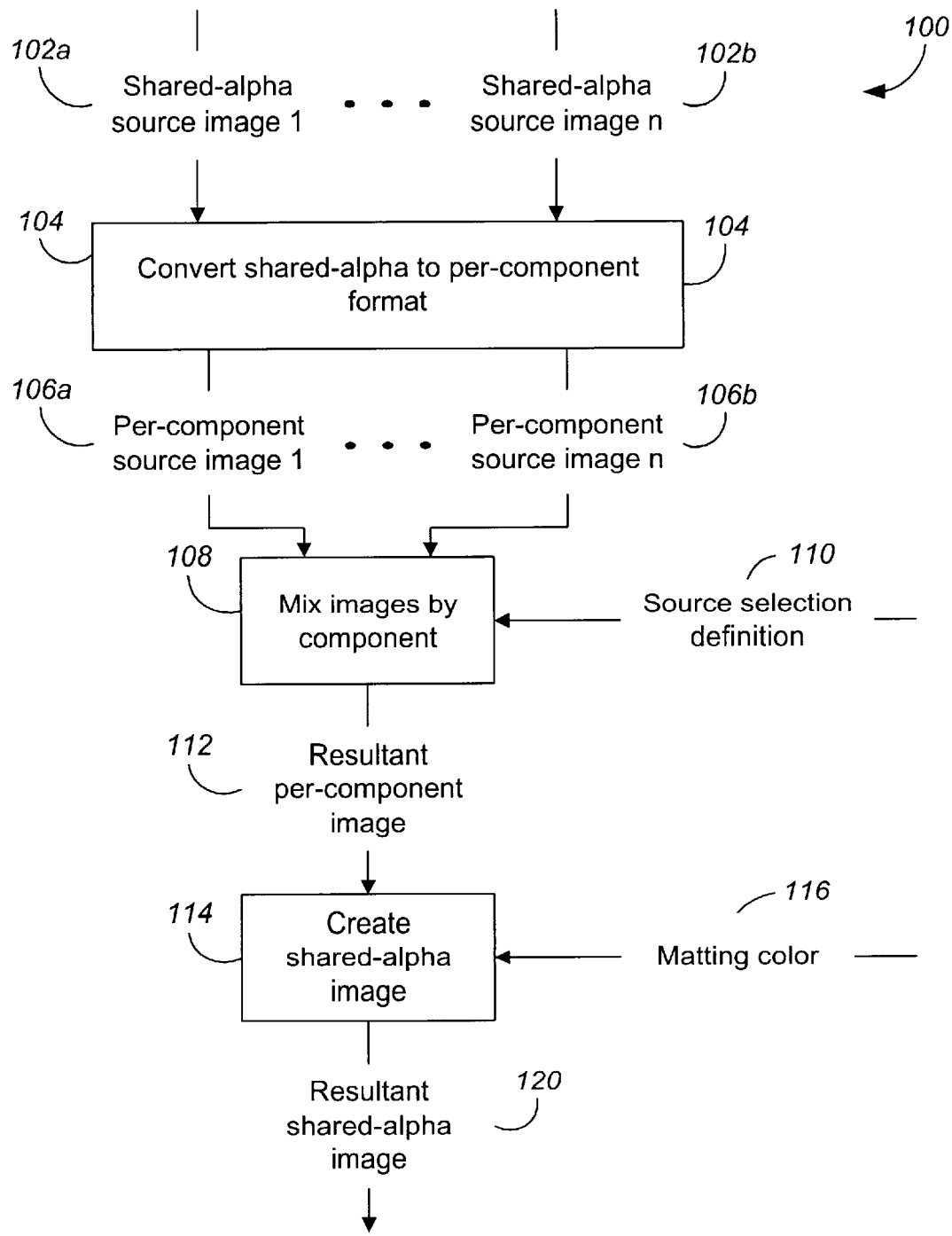
FIGS. 1, 2, and 3 are flowcharts of processes for mixing images in accordance with the invention Like reference symbols in the various drawings indicate like elements.

The invention addresses the problem of how to integrate overprinting into an imaging model with transparency. Overprinting is a practice in printing of only marking a subset of the plates (i.e., of the set of color components) during a given drawing operation.

One aspect of the problem arises from the use of shared-alpha format, in which the alpha component of a color at a location in an image applies to all of the color components at the location. In overprinting, one wants to change some of the color components, but completely transparent areas have no color value. If one changes the alpha component from completely transparent to at least partially opaque, one has to mark some of the previously-undefined color components—other than the overprinted components—in such a way that they do not appear to have changed.

Some graphics programs impose the restriction that if a marking operation does not mark all of the color components, then the alpha component cannot change either. This approach fails when one draws an overprinting object onto a transparent background; nothing happens because the alpha component does not change.

Using an alternative approach, the Adobe Graphics Manager ("AGM", from Adobe Systems Incorporated of San Jose, Calif., which implements the Adobe Imaging Model) addresses the problem by trying to integrate overprint into the compositing process by using special color blending modes (also known as transfer modes) and default colors for the components that are not to be marked. One limitation of this approach is that it cannot work with color blending modes using multiple color components if those components include components that are not to be marked. Another limitation is that the AGM transparency model is not designed for marking operations that do not increase opacity.

In each case, these restrictions are implemented on a per drawing operation basis, i.e., they specify how to composite one element into the accumulation while in principle only marking some of the components.

The invention addresses the problem by using matted images. Any matting color can be chosen; however, it is advantageous to choose a matting color that generates reasonable effects in the color space when used as the default color for unmarked components.

The invention also uses images in per-component format. From a shared-alpha image, one produces an image in alpha-per-component format (a "per-component image") simply by replicating the alpha value to each of the components. Converting an image from an alpha-per-component format to shared-alpha format is more complicated. In this case, some information must be discarded in the conversion from 2n numbers (n color components and n alphas) to n+1 numbers. This can be achieved by using a matting color, as will be described.

Consider the case of a CMYK image with per-component alpha. To print such an image, one puts down on each plate an ink density equal to the density indicated in the color component times the alpha value for the component at the location. The reasoning behind this is that one wants to composite into each of the plates and the plates start with no ink. This resulting image is the same as taking the color components after matting the image against (0%, 0%, 0%, 0%)—i.e., against white. (This is referred to as a matted image rather than a pre-multiplied image because it is possible that the CMYK data is not stored in a form where a color component value of zero indicates 0% ink.)

For many color models, there is a natural matting color, and this is the color that is selected. For CMYK, it is the white of paper. For RGB, it is the black of a monitor that is not emitting any light. The invention does not depend on particular properties of the selected matting color, but the results may appear more correct if the natural matting color for a color model is used. In a CMYK color space, for example, one generally wants to use 0% ink in each component as the matting color because taking this color and only marking the cyan component results in a cyan tint, for example. In the case of a RGB color space, one generally wants to use black because changing just the red component of black in RGB will produce a shade of red. However, other matting colors can be used and the matting color can even vary by location in the image.

Given a shared-alpha matted image and a non-zero alpha value, the linear equations defined by the matted format can be solved to derive the unmatted color. In particular, if $X_i$ is the matted component, then $C_i=(X_i-M_i*(1-A))/A$, where A is the shared alpha value. When $A=0$, the matting equations presented earlier require that $X_i=M_i$. This results in an indeterminate value for $C_i$, as one would expect, there being no specific color at fully transparent locations.

A shared alpha value at a location in an image is calculated from the per-component alpha values at the location by taking the maximum of all of the per-component alpha values. The calculated alpha value must be at least this large to avoid the need to generate out-of-range color components when solving the above equations. For the case where all of the alpha values are equal, the calculated alpha value should not be any larger to avoid errors in round-trip calculations from shared-alpha to per-component alpha and back again.

Thus, given a matted per-component image $<<X_0, A_0>, \ldots, <X_n, A_n>>$ where the matting color component values are $M_i$, the unmatted shared-alpha image $<C_0, \ldots, C_n, A>$ is calculated in accordance with the following formulas:

$$A = \text{Max } \{A_i,$$

where i ranges over the color components}

$$C_i = (X_i - M_i*(1-A))/A \quad \text{(Eq. 1)}$$

If a matted shared-alpha image is desired, one uses the $X_i$ values rather than performing the above calculating of $C_i$ colorant component values.

As shown in FIG. 1, from (i) two or more source images in shared-alpha format 102a ... 102b, (ii) a source selection definition 110 defining which image is to supply each color component in a result image, and (iii) a matting color 116, a new shared-alpha image 120 is built by performing a component-restricted blending of the source images 102a ... 102b. This involves the following three steps:

1. Convert each shared-alpha source image 102a ... 102b into a corresponding per-component source image 106a ... 106b (step 104).
2. Assemble a new, mixed, per-component image 112 by selecting the color and alpha pairs for the components from the color and alpha pairs in the per-component source images 106a ... 106b according to the source selection definition 110 (step 108).
3. Convert the new per-component image 112 into a shared-alpha image 120 using the given matting color 116 (step 114), as described in this specification.

The matting color can be used at different points in this process because many of the operations used in this process commute. For example, the steps can be matting, converting to per-component alpha, mixing components, converting to shared alpha, and unmatting. Or, for another example, they can be converting to per-component alpha, mixing, matting, converting to shared alpha, and unmatting. If the per-component source images and shared-alpha source images are all matted with the same color or unmatted, the source images can be mixed (step 108) without creating separate per-component source images, because the alpha and color values can simply be picked up from the shared-alpha form.

In general, the conversion from per-component alpha to shared alpha is done in matted space. In Equation 2, below, the matting, mixing, and unmatting are combined into a single, more complex step. This has the advantage of avoiding precision loss from matting and unmatting when the alpha value does not change. That is, if A=A[s(i)], then one need not process the color component and can just use Ci=Ci[s(i)].

Thus, denoting color component i of source image j as Ci[j], and the chosen source image j for the i-th color component as s(i), then the resulting Ci and A of the resulting image at a particular location is as follows:

A=Max {A[s(i)] at the location, where i ranges over the color components}

$$Ci = ((Ci[s(i)] * A[s(i)] + Mi * (1 - A[s(i)])) - Mi * (1 - A))/A \quad \text{(Eq. 2)}$$
$$= (Ci[s(i)] * A[s(i)] + Mi * (A - A[s(i)]))/A$$
$$= Ci[s(i)] * (A[s(i)]/A) + Mi * (1 - A[s(i)]/A)$$

Where the term A[s(i)]/A is 0/0, the result is defined to be zero because this does not favor any source color over any other.

If both the source and result images are in matted form with the same matting color, the equations become simpler. The maximum of the alpha values is still taken, but now the appropriate matted color components can be used as is.

If the alpha values are all one, then this technique corresponds to picking from the components of the input images.

In discussing the case of a matted source image, it was assumed that the matting color of the source image was the same as the matting color used to convert from the per-component mixed image to the shared-alpha final result. However, if the source image is matted with a different color, the matting color can easily be changed from old to new, without dematting, by using the following equation:

Ci[new]=Ci[old]+(1-alpha)*(Mi[new]-Mi[old])

Figure 2:
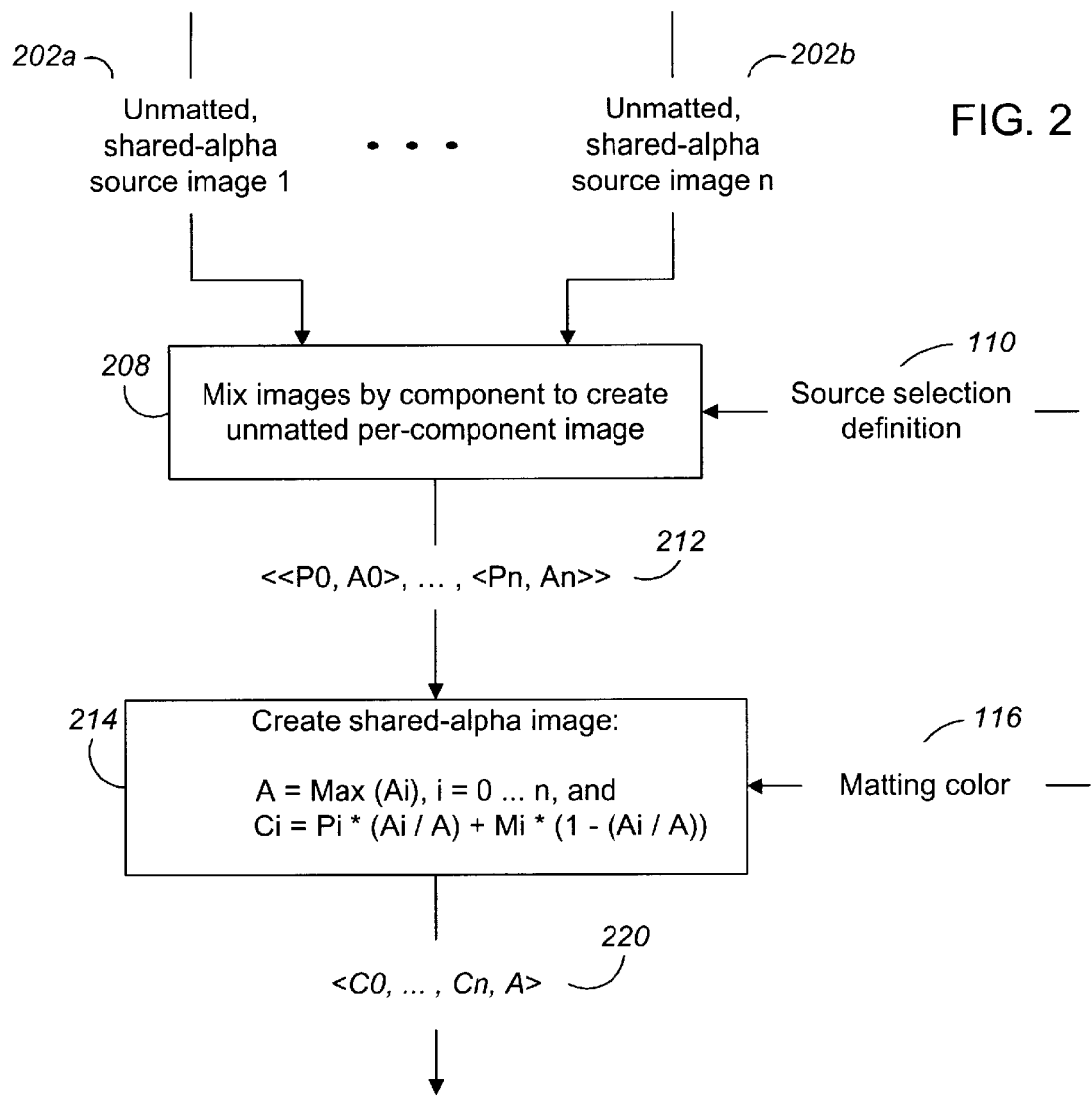

As shown in FIG. 2, in an alternative (but mathematically equivalent) approach to performing the calculations, one begins with unmatted, shared-alpha source images 202a . . . 202b, mixes them to create an unmatted per-component image <<P0, A0>, . . . , <Pn, An>> 212 according to a source selection definition 110 (step 208), (i.e., Pi=Ci[s(i)]; Ai=A[s(i)]) and converts the mixed per-component image into a final unmatted shared-alpha image <C0, . . . , Cn, A> 220 according to the following equations (step 214):

A=Max(Ai), where i ranges over the color components, and

Ci=Pi*(Ai/A)+Mi*(1-(Ai/A)).

The shared-alpha source images can be, and for efficiency would be, mixed without creating a separate per-component source image.

So, to summarize, this technique can take two or more shared-alpha source images, a specification of which image is to provide each color component of a result image, and a matting color, and can construct a shared-alpha image with the color components originating as indicated.

The technique provides a way to do overprinting in a context with transparency. Overprinting traditionally involves marking a graphic object into an accumulation in such a way that some of the plates (i.e., color components) are not changed. If the accumulation has an alpha value, marking into a subset of the color components without changing the alpha may result in invisible marks, as described earlier.

By using component-restricted blending, however, the marking operation that is to be overprinted can be applied to all of the color components and the alpha component. Then the images from before and after the marking operation can be mixed by component-restricted blending to arrive at a final image in which the components that should not be marked match the before image as closely as possible. In particular, if composited against a background containing the matting color, the before and after images will match for the components not marked by the marking operation. The source selection definition defines the color components that should not be marked as being supplied by the before image and the other color components as being supplied by the after image. This limits the changes to extensions using the matting color, that is, the matting color is put in areas made more opaque than they were before. In a CMYK image matted with white, for example, as the shared alpha value becomes more opaque, the ink values in the unmarked components move toward 0% ink so that the resultant printed color (derived by multiplying the ink percentage by the alpha value) remains the same. Note that if the marking operation erases, the areas made more opaque by the component-restricted blending are in the after image.

This technique for handling overprinting generalizes to non-ink based models and provides a general process for marking a subset of the color components in an image with shared alpha.

The marking operation can be fully general; that is, overprinting as described above can be implemented for any arbitrary marking operation. All that is needed is a before image, an after image, and an indication of which color components should change as little as possible. This technique can also be wrapped around a collection of marking operations such as a collection of layers to be composited. This means that it can serve as a grouping construct acting on color components the way a conventional mask operates spatially.

Using the techniques described above, one can implement the overprinting and component-restricted blending as a blending option independent of the transfer mode in the compositing of a single element. This can be done by blending the element into the base image to form an intermediate image and then using component-restricted blending to build the final result by combining the intermediate image with the base image. Thus, for example, one can perform a color-only blend that only affects the red and green components while leaving the blue component untouched.

Figure 3:
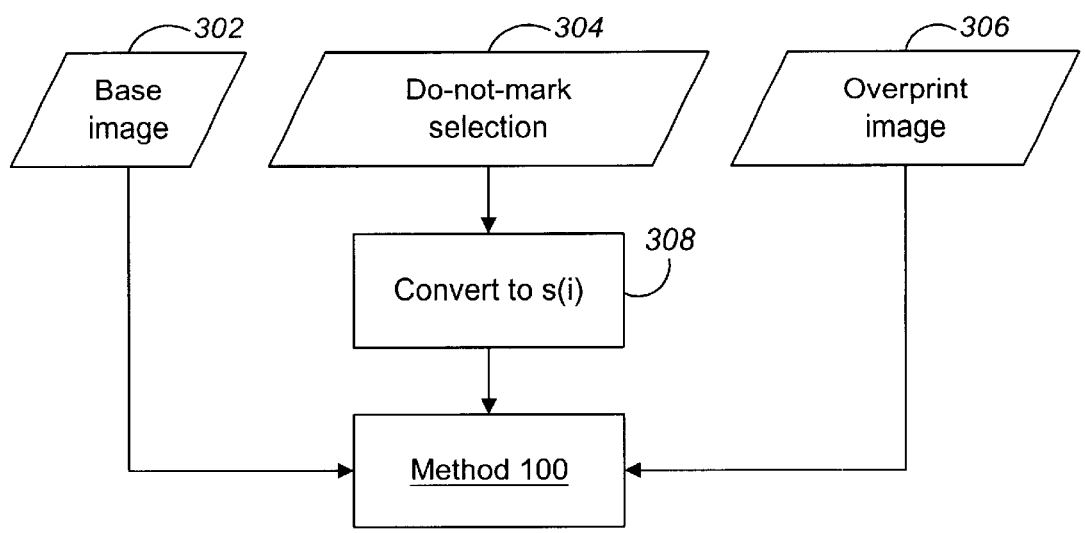

To take a particular example, the features of the invention can be made available to a user using a graphics computer program such as Adobe Photoshop® (available from Adobe Systems Incorporated of San Jose, Calif.). As shown in FIG. 3, working with a digital image, such a user can select a blending option 304 for a graphics element 306 through a dialog or other user interface construct. The term element is used generically to refer to any image component that can be marked or blended, such as a simple or compound object, a layer, or a group of layers. The selected blending option 304 is used to create a source selection definition 110 (FIG. 1) that defines which color components the user wants not to change when the selected element is blended into (i.e., composited into) the base background or accumulation 302 below it (step 308). The selection of a blending option 304 can explicitly identify the components to be left unchanged, or those components can be identified implicitly, for example by identifying the components to be overprinted.

To perform the user-selected blending, a copy of the base 302 into which the element 306 is to be composited is saved in a temporary buffer. The composition proceeds normally into the base to create an intermediate result in whatever way the compositing operations may be defined. Then the intermediate result and the temporary buffer are blended with component-restricted blending (method 100, FIG. 1) based on the source selection definition derived from the blending option 304, with the color components not to be marked coming from the temporary buffer and the other color components coming from the intermediate result, to generate the final result. In this way, the invention can provide generalized component-restricted blending groups.

A graphics program can apply the component restrictions at a variety of places—e.g., at the same point that the color-transfer mode for a layer is applied; however, it is advantageous to apply the component restrictions at the same point that global opacity is applied. By doing so, all of the effects interact without regard to component restrictions and only afterward are the restrictions applied.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, the actions of the invention can be performed in other orders and still achieve its advantages. Particular image buffers can be used to perform operations according to the contents of the buffers, independent of the names given to the buffers, and the order of commutative operations can be changed. Component-restrictive blending can be performed with a spatially varying matte color—i.e., a matte image. This can be useful in systems that seek to do backdrop removal from groups.

The source selection definition is generally location independent; however, a location dependent function can be implemented. A location-dependent source selection function is advantageously defined so as to be continuously variable to avoid artifacts at transitions. A continuously variable source selection produces a mixed per-component image by crossfading the source per-component image components according to a selection value between zero and one. If there are more than two source images, a generalized crossfade is used.

The computations will be illustrated in the following example, in which the source images and the result are all matted images, matted with the matting color. A continuously variable selection function s(i) for J+1 input images is represented by a matrix of elements S(i, j), where i ranges over the color components, j ranges over 0 . . . J, and the sum of S(i, j) over j for any i is equal to 1. In this case, the matted mixed color components and alpha at each location of the new mixed image satisfy the following equations.

$$Xi[\text{new}] = \sum_j Xi[j] \cdot S(i, j)$$

$$Ai[\text{new}] = \sum_j Ai[j] \cdot S(i, j)$$

The new, mixed, matted image can be converted to an unmatted and/or shared-alpha image as described above.

Accordingly, other embodiments are within the scope of the following claims.

What is claimed is:

1. A method for combining source images to form a final image, each image being a digital image defined by color component values and a transparency value, the method comprising:

converting each of two or more shared-alpha source images into corresponding per-component source images in which each color component value is paired with a per-component alpha value, the alpha value indicating to what extent color exists in a range of fully transparent to fully opaque;

assembling a new image in per-component format by selecting each color and alpha pair for each component of the new image from exactly one of the source images in per-component format according to a source selection definition; and converting the new per-component image into shared-alpha format to generate the final image in shared-alpha format.

2. The method of claim 1, wherein:

the new per-component image is a matted image having color and alpha pairs at each location of the image <<X0, A0>, . . . , <Xn, An>>, the Xi being the color value of the new image of the i-th color component, the Ai being the alpha value paired with the i-th color component, and the image being matted with a matting color M having color component values Mi; and the final image is in a matted shared-alpha format <C0, . . . , Cn, A>, the Ci being the color value of the i-th color component and the A being the shared alpha value, the Ci and A satisfying the two relationships $A \geq Max(Ai)$, where i ranges over the color components, and $Ci=Xi$.

3. The method of claim 2, wherein:
A=Max(Ai); and
the source images are converted into a matted format with the matting color M before the assembling of the new per-component image occurs.

4. The method of claim 1, wherein:
the new per-component image is a matted image having color and alpha pairs at each location of the image <<X0, A0>, . . . , <Xn, An>>, the Xi being the matted color value of the i-th color component, the Ai being the alpha value paired with the i-th color component, and the image being matted with a matting color M having color component values Mi; and the final image is in an unmatted shared-alpha format <C0, . . . , Cn, A>, the Ci being the color value of the i-th color component and the A being the shared alpha value, the Ci and A satisfying the two relationships $A \geq Max(Ai)$, where i ranges over the color components, and $Ci=(Xi-Mi*(1-A))/A$.

5. The method of claim 4, wherein the source images are converted into a matted format with the matting color M before the assembling of the new per-component image occurs.

6. The method of claim 5, wherein the source images are converted from an unmatted format.

7. The method of claim 5, wherein the source images are converted from a matted format with a matting color different from M.

8. The method of claim 4, wherein A=Max(Ai).

9. The method of claim 8, wherein the source selection definition is location independent.

10. The method of claim 8, wherein the number of source images is two.

11. The method of claim 10, wherein the color components are cyan, magenta, yellow, and black and the matting color M is white.

12. A method for combining source images to form a final image, each image being a digital image defined by color component values and a transparency value, the method comprising:

converting each of two or more unmatted, shared-alpha source images into a corresponding unmatted per-component source image in which each color component value is paired with a per-component alpha value, the alpha value indicating to what extent color exists in a range of fully transparent to fully opaque;

assembling a new image in per-component format <<P0, A0>, . . . , <Pn, An>> by selecting each color and alpha pair for each component of the new image from exactly one of the per-component source images according to a source selection definition; and converting the new per-component image into a final unmatted shared-alpha image <C0, . . . , Cn, A>, the Ci being the color value of the i-th color component of the final image and the A being the shared alpha value of the final image, the Ci and A satisfying the two relationships $A=Max(Ai)$, where i ranges over the color components, and $Ci=Pi*(Ai/A)+Mi*(1-(Ai/A))$, where Mi is the color value of the i-th color component of a matting color.

13. A method for converting an image in a per-component format into an image in a shared-alpha format, the method comprising:

receiving a matted per-component image having color and alpha pairs at each location representable as <<X0, A0>, . . . , <Xn, An>>, the Xi being the matted color value of the i-th color component and the Ai being the alpha value paired with the i-th color component of the per-component image; and calculating the color values and alpha of a shared-alpha image representable as <C0, . . . , Cn, A>, the Ci being the color value of the i-th color component and the A being the shared alpha value, the Ci and A being calculated to satisfy the relationships $A \geq Max(Ai)$, where i ranges over the color components, and $Ci=(Xi-Mi*(1-A))/A$, where Mi is the color value of the i-th color component of a matting color.

14. The method of claim 13, wherein A=Max(Ai).

15. The method of claim 14, wherein the number of source images is two.

16. The method of claim 15, wherein the color components are cyan, magenta, yellow, and black and the matting color is white, representable as <0,0,0,0>.

17. A method for converting an image in a per-component format into an image in a shared-alpha format, the method comprising:

receiving an unwatted per-component image having color and alpha pairs at each location representable as <<P0, A0>, . . . , <Pn, An>>, the Pi being the color value of the i-th color component and the Ai being the alpha value paired with the i-th color component of the per-component image; and calculating the color values and alpha of an unmatted shared-alpha image representable as <C0, . . . , Cn, A>, the Ci being the color value of the i-th color component and the A being the shared alpha value, the Ci and A being calculated to satisfy the relationships $A \geq Max(Ai)$, where i ranges over the color components, and $Ci=Pi*(Ai/A)+Mi*(1-(Ai/A))$, where Mi is the color value of the i-th color component of a matting color.

18. The method of claim 17, wherein A=Max(Ai).

19. The method of claim 18, wherein the number of source images is two.

20. The method of claim 19, wherein the color components are cyan, magenta, yellow, and black and the matting color is white, representable as <0,0,0,0>.

21. A method for overprinting an element into a base image having transparency, the method comprising:

marking an element into a base image; and using component-restricted blending to blend the base image from before the marking operation with the base image after the marking operation to generate a final image in which one or more excluded color components match closely in the base image, whereby only a subset of the color components of the resulting base image appear to have been marked, the component-restricted blending comprising converting shared-alpha source images into corresponding per-component source images, assembling a new, mixed, per-component image by selecting color and alpha pairs from the per-component source images according to a source selection definition, and converting the new, mixed, per-component image into a shared-alpha image.

22. A method for combining source images to form a final image, each image being a digital image defined by color component values and a transparency value, the method comprising:

receiving two or more source images, each defined by color component and alpha information;

assembling a new, mixed image in per-component format by applying a selection operation on the color and alpha information of the source images to define color component and alpha information of the new image according to a source selection definition; and converting the new per-component image into a shared-alpha format to generate the final image in shared-alpha format.

23. The method of claim 22, wherein the source selection definition corresponds to a selection matrix with elements S(i, j), where i ranges over the color components, j ranges over the source images, and S(i, j) is the weight given to the contribution to the i-th color component and alpha of the mixed image from the i-th color component and alpha of the j-th source image.

24. A software product tangibly embodied in a machine-readable medium, for combining source images to form a final image, each image being a digital image defined by color component values and a transparency value, the software product comprising instructions operable to cause one or more data processing apparatus to perform operations comprising:

converting each of two or more shared-alpha source images into corresponding per-component source images in which each color component value is paired with a per-component alpha value, the alpha value indicating to what extent color exists in a range of fully transparent to fully opaque;

assembling a new image in per-component format by selecting each color and alpha pair for each component of the new image from exactly one of the source images in per-component format according to a source selection definition; and converting the new per-component image into shared-alpha format to generate the final image in shared-alpha format.

25. The software product of claim 24, wherein:

the new per-component image is a matted image having color and alpha pairs at each location of the image <<X0, A0>, . . . ,<Xn,An>>, the Xi being the color value of the new image of the i-th color component, the Ai being the alpha value paired with the i-th color component, and the image being matted with a matting color M having color component values Mi; and the final image is in a matted shared-alpha format <C0, . . . Cn,A>, the Ci being the color value of the i-th color component and the A being the shared alpha value, the Ci and A satisfying the two relationships A≥Max (Ai), where i ranges over the color components, and Ci=Xi.

26. The software product of claim 25, wherein: A=Max (Ai); and the source images are converted into a matted format with the matting color M before the assembling of the new per-component image occurs.

27. The software product of claim 24, wherein:

the new per-component image is a matted image having color and alpha pairs at each location of the image <<X0, A0>, . . . ,<Xn, An>>, the Xi being the matted color value of the i-th color component, the Ai being the alpha value paired with i-th color component, and the image being matted with a matting color M having color component values Mi; and the final image is in an unmatted shared-alpha format <C0, . . . ,Cn,A>, the Ci being the color value of the i-th color component and the A being the shared alpha value, the Ci and A satisfying the two relationships A≥Max (Ai), where i ranges over the color components, and Ci=(Xi−Mi*(1−A))/A.

28. The software product of claim 27, wherein the source images are converted into a matted format with the matting color M before the assembling of the new per-component image occurs.

29. The software product of claim 28, wherein the source images are converted from an unmatted format.

30. The software product of claim 28, wherein the source images are converted from a matted format with a matting color different from M.

31. The software product of claim 27, wherein A=Max (Ai).

32. The software product of claim 31, wherein the source selection definition is location independent.

33. The software product of claim 31, wherein the number of source images is two.

34. The software product of claim 33, wherein the color components are cyan, magenta, yellow, and black and the matting color M is white.

35. A software product tangibly embodied in a machine-readable medium, for combining source images to form a final image, each image being a digital image defined by color component values and a transparency value, the software product comprising instructions operable to cause one or more data processing apparatus to perform operations comprising:

converting each of two or more unmatted, shared-alpha source images into a corresponding unmatted per-component source image in which each color component value is paired with a per-component alpha value, the alpha value indicating to what extent color exists in a range of fully transparent to fully opaque;

assembling a new image in per-component format <<P0, A0>, ... ,<Pn,An>> by selecting each color and alpha pair for each component of the new image from exactly one of the per-component source images according to a source selection definition; and converting the new per-component image into a final unmatted shared-alpha image <C0, ... ,Cn,A>, the Ci being the color value of the i-th color component of the final image and the A being the shared alpha value of the final image, the Ci and A satisfying the two relationships A=Max (Ai), where i ranges over the color components, and Ci=Pi*(Ai/A)+Mi*(1−(Ai/A)), where Mi is the color value of the i-th color component of a matting color.

36. A software product tangibly embodied in a machine-readable medium, for converting an image in a per-component format into an image in a shared-alpha format, the software product comprising instructions operable to cause one or more data processing apparatus to perform operation comprising:

receiving a matted per-component image having color and alpha pairs at each location representable as <<X0, A0>, ... ,<Xn,An>>, the Xi being the matted color value of the i-th color component and the Ai being the alpha value paired with the i-th color component of the per-component image; and calculating the color values and alpha of a shared-alpha image representable as <C0, ... ,Cn,A>, the Ci being the color value of the i-th color component and the A being the shared alpha value, the Ci and A being calculated to satisfy the relationships A=Max (Ai), where i ranges over the color components, and Ci=(Xi−Mi*(1−A))/A, where Mi is the color value of the i-th color component of a matting color.

37. The software product of claim 36, wherein A=Max (Ai).

38. The software product of claim 37, wherein the number of source images is two.

39. The software product of claim 38, wherein the color components are cyan, magenta, yellow, and black and the matting color is white, representable as <0,0,0,0>.

40. A software product tangibly embodied in a machine-readable medium for converting an image in a per-component format into an image in a shared-alpha format, the software product comprising instructions operable to cause one or more data processing apparatus to perform operation comprising:

receiving an unmatted per-component image having color and alpha pairs at each location representable as <<P0, A0>, ... ,<Pn,An>>, the Pi being the color value of the i-th color component and the Ai being the alpha value paired with the i-th color component of the per-component image; and calculating the color values and alpha of an unmatted shared-alpha image representable as <C0, ... ,Cn,A>, the Ci being the color component and the A being the shared alpha value, the Ci and A being calculated to satisfy the relationships A≥Max (Ai), where i ranges over the color components, and Ci=Pi*(Ai/A)+Mi*(1−(Ai/A)), where Mi is the color value of the i-th color component of a matting color.

41. The software product of claim 40, wherein A=Max (Ai).

42. The software product of claim 41, wherein the number of source images is two.

43. The software product of claim 42, wherein the color components are cyan, magenta, yellow, and black and the matting color is white, representable as <0,0,0,0>.

44. A software product tangibly embodied in a machine-readable medium, for overprinting an element into a base image having transparency, the software product comprising instruction operable to cause one or more data processing apparatus to perform operations comprising:

marking an element into a base image; and using component-restricted blending to blend the base image from before the marking operation with the base image after the marking operation to generate a final image in which one or more excluded color components match closely in the base image, whereby only a subset of the color components of the resulting base image appear to have been marked, the component-restricted blending comprising converting shared-alpha source images into corresponding per-component source images, assembling a new, mixed, per-component image by selecting color and alpha pairs from the per-component source images according to a source selection definition, and converting the new, mixed, per-component image into a shared-alpha image.

45. A software product tangibly embodied in a machine-readable medium, for combining source images to form a final image, each image being a digital image defined by color component values and a transparency value, the software product comprising instructions operable to cause one or more data processing apparatus to perform operations comprising:

receiving two or more source images, each defined by color component and alpha information;

assembling a new, mixed image in per-component format by applying a selection operation on the color and alpha information of the source images to define color component and alpha information of the new image according to a source selection definition; and converting the new per-component image into a shared-alpha format to generate the final image in shared-alpha format.

46. The software product of claim 45, wherein the source selection definition corresponds to a selection matrix with elements S(i,j), where i ranges over the color components, j ranges over the source images, and S(i,j) is the weight given to the contribution to the i-th color component and alpha of the mixed image from the i-th color component and alpha of the j-the source image.

* * * * *

UNITED STATES PATENT AND TRADEMARK OFFICE
CERTIFICATE OF CORRECTION

PATENT NO. : 6,825,852 B1
DATED : November 30, 2004
INVENTOR(S) : Mark Hamburg

It is certified that error appears in the above-identified patent and that said Letters Patent is hereby corrected as shown below:

Column 11,
Lines 9 and 33, replace "$\geqq$" with -- $\geq$ --;

Column 12,
Lines 34 and 62, replace "$\geqq$" with -- $\geq$ --;
Line 38, replace "-" with -- = -- ;
Line 50, replace "unwatted" with -- unmatted --;

Column 15,
Line 33, replace "=" with -- $\geq$ --;
Line 58, after "color", insert -- value of the ith color --.

Signed and Sealed this

Fifteenth Day of February, 2005

JON W. DUDAS
*Director of the United States Patent and Trademark Office*